Figure 1:
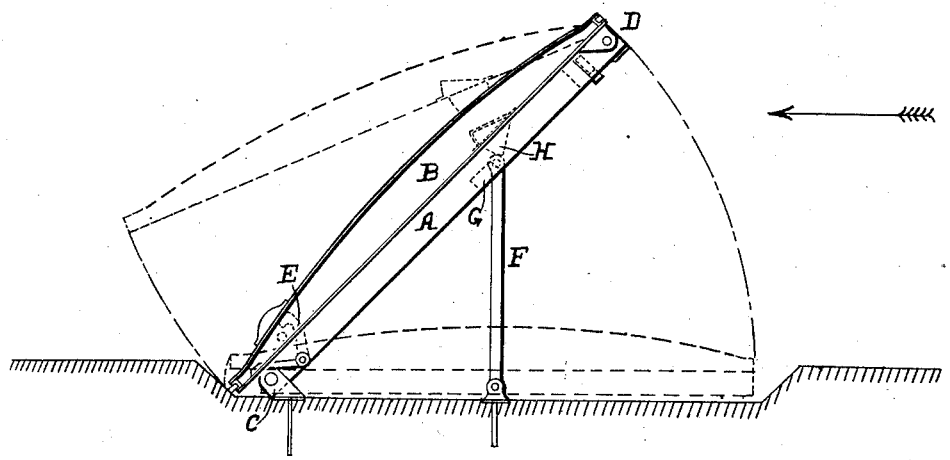

J. ASHFORD & S. LEGGETT.
PNEUMATIC WEIR SHUTTER.
APPLICATION FILED MAR. 30, 1912.

1,040,112.

Patented Oct. 1, 1912.
2 SHEETS—SHEET 1.

WITNESSES

INVENTORS
JOHN ASHFORD,
STEPHEN LEGGETT
By Hinsman and Stinson, Attys

J. ASHFORD & S. LEGGETT.
PNEUMATIC WEIR SHUTTER.
APPLICATION FILED MAR. 30, 1912.
1,040,112.
Patented Oct. 1, 1912.
2 SHEETS—SHEET 2.
FIG. 5.
FIG. 6.
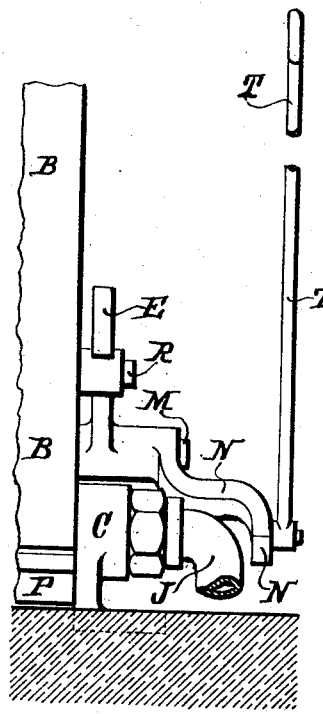
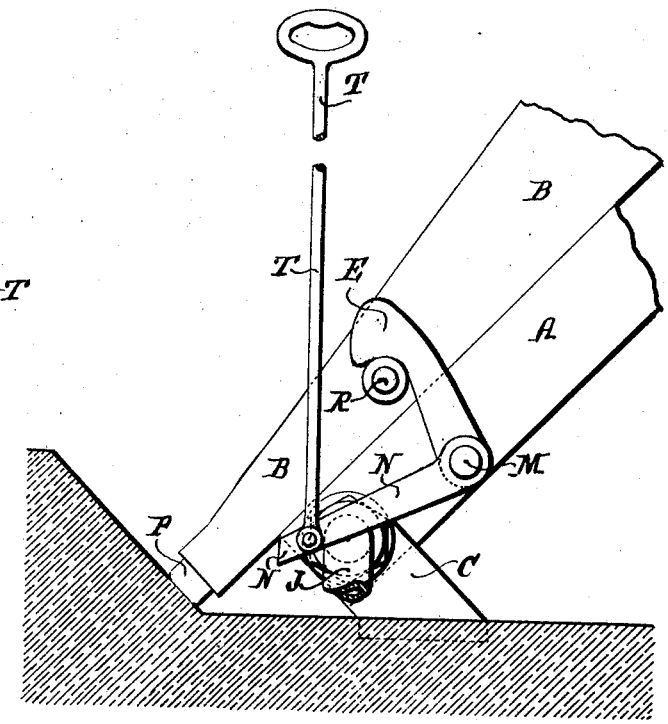
FIG. 7.
FIG. 8.
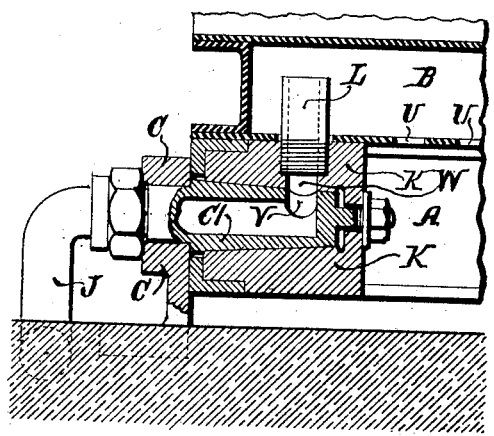
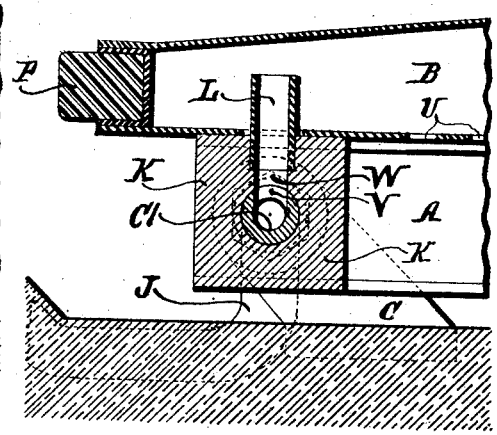
WITNESSES
L. H. Grote
M. E. Keir
INVENTORS
JOHN ASHFORD
STEPHEN LEGGETT
By Howson and Howson
their Attorneys
COLUMBIA PLANOGRAPH CO., WASHINGTON, D. C.

UNITED STATES PATENT OFFICE.

JOHN ASHFORD AND STEPHEN LEGGETT, OF AMRITSAR, INDIA.

PNEUMATIC WEIR-SHUTTER.

1,040,112.

Specification of Letters Patent. Patented Oct. 1, 1912.

Application filed March 30, 1912. Serial No. 687,432.

*To all whom it may concern:*

Be it known that we, JOHN ASHFORD and STEPHEN LEGGETT, subjects of the King of Great Britain and Ireland, and residents of Amritsar, Punjab, India, have invented certain new and useful Pneumatic Weir-Shutters, and of which the following is the specification.

Weir shutters are used to increase the height of weirs or dams that may be built in the beds of rivers or other situations to impound water for irrigation, hydro-electric installations, or other purposes. The weir shutters are usually attached to the tops of the dams or weirs to increase the height under normal conditions, and they are so arranged that at the approach of a flood they may be lowered to give a clearer passage for the water.

The object of this invention is to provide a weir shutter which may be readily raised in deep water and which may with equal readiness be lowered again.

The manner in which it is arranged to lift the shutters from their recumbent position is to construct the shutter in part of a tank or float closed above but with openings beneath, and air suitably compressed is conveyed through a pipe, so arranged that the air can be delivered through the openings beneath into the said tank or float to displace the water, the tank or float so becoming buoyant that it will rise in water, the buoyancy causing the shutter to rise into the position required. The shutter is constructed also in part of a frame that is attached by hinges to the weir crest, the part of the frame where it hinges to the weir crest may for convenience be called the lower end or bottom of the shutter. The tank or float aforementioned is attached to the frame by hinges to the top end, that is to say at the opposite end to the hinges which attach the frame to the weir crest. The tank or float may also be secured to the frame at the lower end by a catch of any design which may in any suitable manner be actuated to attach or lock the tank or float to the frame at the lower end, or on the contrary, may in any suitable manner be actuated to release or unlock the tank or float from the frame so that its lower end may become detached from the frame, the only remaining attachment between the tank or float and the frame being the hinged connection at the top end.

It is preferred to so attach the shutter to the weir that when recumbent the upper end of the shutter points up-stream, and also to limit the movement of the shutter when it is raised so that its angle to the horizontal is less than a right angle, and this range of movement is limited by one or more rods or other attachments, or by some form of stop suitably placed.

Preferably the rods used to limit the movement of the shutter when it rises should be equally effective either as tension or as compression elements. For convenience the rods are attached by hinge pins to a suitably situated anchorage in the weir masonry. The upper end of the rods have cross-pins to form T-shaped ends, and they are constrained within a T-shaped groove in the shutter frame, in such manner that they may slide along the grooves until they engage stops which limit the motion and thereby limit the angle of lift of the shutter.

Beneath the tank and attached thereto, detents are placed and so situated that they, from the upper side, penetrate the grooves in which the T-shaped rod-ends slide, and the object of these detents is that they may engage the rod-ends when the shutter is raised and so prevent the shutter from falling if the tank loses its buoyancy.

As the top of the shutter when recumbent, points up-stream, the effort of lifting is assisted by the stream when the lift has been commenced.

When the shutter is in elevated position, the pressure of the impounded water tends to force the tank or float away from the frame, and when the catch or fastening, which locks the tank or float to the lower end or bottom of the frame, is released, the water pressure forces the tank or float away from the frame except in so far as it is fastened to the frame by hinges at the top end, thus the impounded waters are allowed to escape. The movement of the tank or float away from the frame, withdraws the detents which locked the aforementioned rods in the grooves of the frame, and thus the frame is free to fall into a recumbent position. As the tank or float is now attached to the frame at the top end only, the whole weight of the frame is concentrated at that end, and the tank tilts downward. This places the openings beneath the tank, at its lower end, in a higher position, the tank becomes filled with water, and the whole sinks down into the recumbent position.

Figure 2:
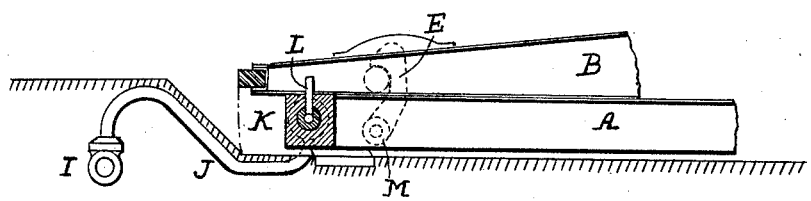
Figure 3:
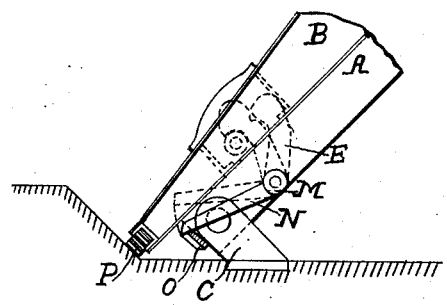
Figure 4:
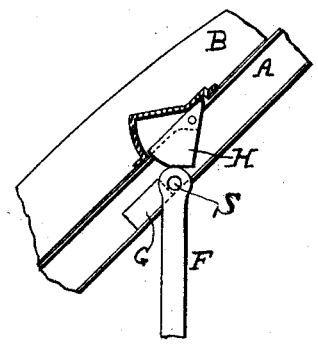

In order that the invention and the manner of performing the same may be properly understood there is hereunto appended two sheets of drawings showing a simple, illustrative and explanatory example of the carrying out of the invention, Figure 1 being a side elevation of the shutter in erect position, Fig. 2 a sectional side elevation of the same in recumbent position, Figs. 3 and 4 sectional elevations of detent details. Figs. 5 and 6 are elevations at right angles to each other, and to an enlarged scale, of the lower portion of the shutter; and Figs. 7 and 8 are sections at right angles to each other of the lower hinge details.

In this example, which is merely illustrative and by no means limitative, the shutter as a whole comprises two main parts, an open frame A, and a tank or float B, (hereinafter called the float). The frame A is attached to the weir by hinges C C' and the float B is attached by hinges D to the frame A at the top end. The float B is also secured to the frame at the bottom end by a fastening E, which may be of any suitable construction, and in the drawings is shown as a hook. The fulcrum or spindle M of the hook E is shown in the frame, and the pin R, which the hooked end catches, is in the float.

When air has been forced into the float to displace the water until there is enough buoyancy, it is obvious that the shutter will lift from the recumbent position dotted in Fig. 1. When erect, it inclines up stream at an angle of 45° or thereabout. The exact angle is not important. Inasmuch as it points up-stream, it is obvious that when lifting, the stream will, once the lifting has commenced, help it up into the erect position, and the impounded water will, when it is erect maintain a pressure upon it, due to any difference of head up and down stream of the shutter.

To secure the shutter in correct position when erect, detaining rods F are placed below, and they are so arranged that their upper ends fit into and slide along T grooves, there being a transverse-pin S fixed in the top end of the rod to keep it in the groove. Within the T groove there is a fixed stop G which limits the movement of the bar along the slot and thereby limits the angle of lift of the shutter. A movable detent H is also provided which locks the rods in position when erect, so preventing the shutter from falling if from any reason the shutter loses its buoyancy. The rods F, whose ends are constrained in the frame A, slide in the frame until the stop G is reached. It may be here explained that it is convenient to build the frame of two main members, at its sides, each of these main members being constructed of two channel irons placed hollow to hollow, so forming the T groove within which the rod ends of F may slide, the pin S in the rod ends resting on the flanges of the channels. When the shutter is erect as in Fig. 1, a detent H (Fig. 4) slips over the end of the rod and so locks it. This detent H, is attached to the float B and merely slips in between the channels to enable it to act as a detent to the rod F.

When the shutter is to be released the following is the action:—The frame A being merely two side members, built into a frame with top and bottom members, is quite open and so is virtually a rectangle which itself cannot impound water. The float B attached to it forms the screen to impound the water, and it will do so, so long as it is secured to the frame. If however the hook E is released in any convenient manner, for example, from the pin R, as hereinafter described the float B will only remain attached to the frame A by the hinges at the top end D, and the water impounded will force away the float as shown by dotted lines in Fig. 1, the water escaping through the frame and under the float. The detent H being attached to the float is lifted away from the rod F, and the frame is no longer locked in erect position. As also the water pressure is no longer operative to maintain it erect, it will tend to fall into recumbent position and it will do so unless otherwise prevented. The float having floated up to water surface becomes for the moment horizontal, but the weight of the frame at D will tend to make that end dip lower in the water. Now, underneath the lower part of the float, at or about the part where the air is admitted, there are large holes U in the plating, through which the water escapes when the air is admitted, and, the float being now tilted so that the end D is the lowest part, the air in the float can escape and water can enter it through these holes. As buoyancy is lost the end D plunges below water, and as the float becomes filled with water it sinks down until it reclines on the frame in recumbent position, the catch E being arranged to automatically secure it in place.

The means for supplying, admitting and controlling the air, comprise an air pump of any suitable type placed in a convenient permanent position and a main pipe I Fig. 2 which is laid in the weir crest, preferably in a channel. From this pipe at intervals, branches J are taken to the shutters. These are coupled to the hinge pins C' which as shown in Figs. 7 and 8 are made hollow for the passage of air. The hinge pins are fixed in the parts C and cannot rotate. Within the frame there is a hinge block K fitting upon the hinge pin. Through both hinge block K and pin C', holes V, W, are drilled in position to coincide when the shutter is recumbent, so that air may have a clear passage through and up a short pipe L secured in the hole W in the block K into the interior of the float, the water escaping through the large holes U farther along in the plating of the float. As the shutter rises, the block K turns around the hinge pin, and the action is similar to that of a plug-cock cutting off the supply of air. We may assume that as the air main pipe I is below water it may become swamped with water when not in use, thus as air is forced into it by the pump the water will be forced back until the branch J to the first shutter of a series is reached, and the air will then pass through J, the easiest way of escape, until that shutter becomes buoyant and lifts, the act of lifting closes the air passage at K, and the air then forces back the water along the main pipe I until the branch J to the second shutter is reached and that shutter is filled with air and lifts. In this manner the shutters rise in regular sequence.

The method of releasing the shutters will be clear from Fig. 3. The hooks E, on either side of frame A are attached to a spindle M which extends beyond the frame at one end, toward the pier or controller's position. On the spindle M there is a lever N. The frame A extends beyond the hinge-pin a short distance, and there is a projecting piece O Fig. 3 attached to it, in such position that the piece O on frame A of the first shutter shall project and engage the lever N of the second shutter. The piece O on shutter frame of the second shall engage lever N of the third shutter and so on. Now when the first shutter is released by a suitable mechanism such for example as a handled spindle T attached to the lever N it descends into recumbent position as hereinbefore described and the piece O rises and lifts the lever N of the second shutter, so rotating spindle M through a small angle, thus unhooking the catch E which releases this second shutter. That in turn, as it falls into recumbent position, in like manner actuates the hooks of the third shutter and so on through any number in series, thus the release of the first shutter causes the release of the whole series, each float being retained in its recumbent position by the catch E being again made to engage the pin R owing to the weight of the lever N (then free) of each succeeding shutter rotating its spindle M.

To keep all water tight when the shutters are raised, the float B is edged along the bottom with a strip P of wood to seat against the weir sill, and also strips of wood may be placed down the sides of the floats to make joints between them.

The essence of the invention lies in the combination broadly of what has been termed a float (that definition covering a device which may be rendered buoyant by displacing water by air) hinged to a frame, and it is evident that the detail of the invention in that matter of detents, air supply, and control mechanism, and so forth, may be widely varied without departing from that essence.

What we claim is:—

1. A weir shutter comprising in combination a part which may be rendered buoyant by the displacement of water by air, means for the supply of this air and for its subsequent discharge, a hinged frame-like part, and hinged and detent interconnections between the parts.

2. A weir shutter comprising in combination a hinged frame and hinged at its upper end to the top thereof a float, means for admitting water to the float to submerge it, means for displacing that water by air and interconnecting detent means between float and frame.

3. A weir shutter comprising in combination a hinged frame and hinged at its upper end to the top thereof a float, means for admitting water to the float to submerge it, means for displacing that water by air, a hook-end fastening fulcrumed in the frame, a pin in the float and means for engaging the fastening with the pin and disengaging it therefrom.

4. A weir shutter comprising in combination a hinged frame and hinged at its upper end to the top thereof a float, means for admitting water to the float to submerge it, means for displacing that water by air, a hook-end fastening fulcrumed in the frame, a pin in the float, means for engaging the fastening with the pin, a lever on the fulcrum of the fastening, and a projection on the frame in such position that it projects and is capable of engaging the fulcrum lever on the succeeding weir shutter so that the release of the first shutter causes the release of the whole series.

5. A weir shutter comprising in combination a hinged frame, a float, a hinge connection between frame and float at their upper ends, interconnecting detent mechanism between their lower ends, a main air supply pipe, branches therefrom to each frame hinge, a block on the hinge, apertures through block and hinge, a pipe leading from these apertures to the interior of the float, and apertures in the float through which water can enter and be forced out of the interior thereof.

6. A weir shutter comprising in combination a hinged frame, a float, a hinge connection between frame and float at their upper ends, interconnecting detent mechanism between their lower ends, means to limit the range of movement of the shutter when it is raised so that its angle to the horizontal is less than a right angle, means for admitting water to the interior of the float, means for displacing that water by air, and interconnecting detent means between float and frame.

7. A weir shutter comprising in combination a hinged frame, a float, a hinge connection between frame and float at their upper ends, interconnecting detent mechanism between their lower ends, a hinged rod, a cross-pin on the upper end of the rod, a groove in the shutter frame in which the cross-pin works stops in the groove, a detent on the float capable of engaging the cross-pin in the groove in the frame, means for admitting water to the interior of the float, means for displacing that water by air, and interconnecting detent means between float and frame.

In testimony whereof we have signed our names to this specification, in the presence of two subscribing witnesses.

JOHN ASHFORD.
STEPHEN LEGGETT.

Witnesses:
L. MORTIMER BAINES,
W. G. WATSON.

---

Copies of this patent may be obtained for five cents each, by addressing the "Commissioner of Patents, Washington, D. C."